US012576653B2

(12) United States Patent
Connell et al.

(10) Patent No.: US 12,576,653 B2
(45) Date of Patent: Mar. 17, 2026

(54) FOOD PRODUCT SCALE AND ASSOCIATED LABEL CASSETTE WITH CASSETTE LOAD FEATURES

(71) Applicant: ILLINOIS TOOL WORKS INC., Glenview, IL (US)

(72) Inventors: Hugh A. Connell, Evesham (GB); Robert Andrew Holmes, Worcester (GB); Ian D. Taylor, Warwickshire (GB); Randall L. Redman, Beavercreek, OH (US); Austin Knoblauch, Centerville, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 83 days.

(21) Appl. No.: 18/756,778

(22) Filed: Jun. 27, 2024

(65) Prior Publication Data

US 2026/0001360 A1      Jan. 1, 2026

(51) Int. Cl.
*B41J 15/04*          (2006.01)
*B41J 3/407*          (2006.01)
*G01G 19/40*          (2006.01)
*G01G 19/52*          (2006.01)

(52) U.S. Cl.
CPC ........... *B41J 15/044* (2013.01); *B41J 3/4075* (2013.01); *G01G 19/40* (2013.01); *G01G 19/52* (2013.01)

(58) Field of Classification Search
CPC ....... B41J 3/4075; B41J 15/044; G01G 19/40; G01G 19/52
See application file for complete search history.

(56) References Cited

U.S. PATENT DOCUMENTS

| 7,988,373 B2 * | 8/2011 | Vandermeulen ....... B41J 3/4075 |
| | | 400/208 |
| 8,517,618 B2 | 8/2013 | Cartwright |
| 11,524,508 B2 | 12/2022 | Redman et al. |

FOREIGN PATENT DOCUMENTS

EP          3939797 A1 *   1/2022   ............ B41J 15/044

* cited by examiner

*Primary Examiner* — Christopher E Mahoney
*Assistant Examiner* — Marissa Ferguson-Samreth
(74) *Attorney, Agent, or Firm* — THOMPSON HINE LLP

(57)          ABSTRACT

A printer includes a printer body including a cassette station, a printhead, and a media cassette for holding a media that moves past the printhead during printing. The media cassette is engageable in a loaded position in the cassette station and is removable from the cassette station for the purpose of media replacement. The printer body includes a load ramp extending outward from the cassette station, wherein the load ramp defines a linear load path for the media cassette and includes a first surface shape. The media cassette includes a cassette body and a load guide that that extends from the cassette body, wherein the load guide includes a second surface shape. The second surface shape is configured to mate with the first surface shape by overlying the first surface shape without surrounding the load ramp.

19 Claims, 10 Drawing Sheets

FOOD PRODUCT SCALE AND ASSOCIATED LABEL CASSETTE WITH CASSETTE LOAD FEATURES

TECHNICAL FIELD

This application relates generally to scales used for weighing food product in supermarkets, groceries and other stores, and, more particularly, to a scale including a cassette load arrangement.

BACKGROUND

In typical commercial food product scale applications the scale is used to weigh food products and determines prices for the food products, and an associated printer prints a label for application to the food product. An operator enters a product number, such as a PLU (price look-up) number, for the product being weighed and the scale accesses its database, or accesses a remote database, for pricing information on the product. The total price for the item is then determined based upon its weight. Price can also be determined based upon item count. In either case, the food product scale typically prints a label with the price and other information for the product.

Such scales, as well as other devices, such as printers, can include label stock or other media cassettes that are removable for the purpose of replacing or changing the label stock or other media loaded into the cassette. As used herein, the term printer encompasses both devices that function solely or primarily as printers, as well as other devices that include a printer function but also include other functions in addition to printing, such as a weighing scale that also prints labels. A previous technique for locating and aligning the cassette relative to a printer during the cassette insertion process utilized a single alignment rod on the printer and a corresponding alignment hole located on the cassette. This single alignment feature was located at the rear of the printer and made correctly aligning and inserting the cassette into the printer inconsistent and difficult. The difficulty is increased when the scale is located on a high counter (e.g., 50-60 inches in height).

It would be desirable to provide a scale (or other printer) and associated label (or other media) cassette with a more user-friendly arrangement for loading the label cassette into the cassette station.

SUMMARY

In one aspect, a printer includes a printer body including a cassette station, a printhead, and a media cassette for holding a media that moves past the printhead during printing. The media cassette is engageable in a loaded position in the cassette station and is removable from the cassette station for the purpose of media replacement. The printer body includes a load ramp extending outward from the cassette station, wherein the load ramp defines a linear load path for the media cassette and includes a first surface shape. The media cassette includes a cassette body and a load guide that that extends from the cassette body, wherein the load guide includes a second surface shape. The second surface shape is configured to mate with the first surface shape by overlying the first surface shape without surrounding the load ramp.

In another aspect, a printer includes a printer body including a cassette station, a printhead, and a media cassette for holding a media that moves past the printhead during printing. The media cassette is engageable in a loaded position in the cassette station and is removable from the cassette station for the purpose of media replacement. The printer body includes a load ramp extending outward beyond the cassette station, wherein the load ramp defines a first surface shape. The media cassette includes a cassette body and a load guide that that extends beyond the cassette body, wherein the load guide includes a second surface shape. The second surface shape is configured to mate with the first surface shape by engaging atop the first surface shape without surrounding the load ramp.

The details of one or more embodiments are set forth in the accompanying drawings and the description below. Other features, objects, and advantages will be apparent from the description and drawings, and from the claims.

DETAILED DESCRIPTION

Figure 1:
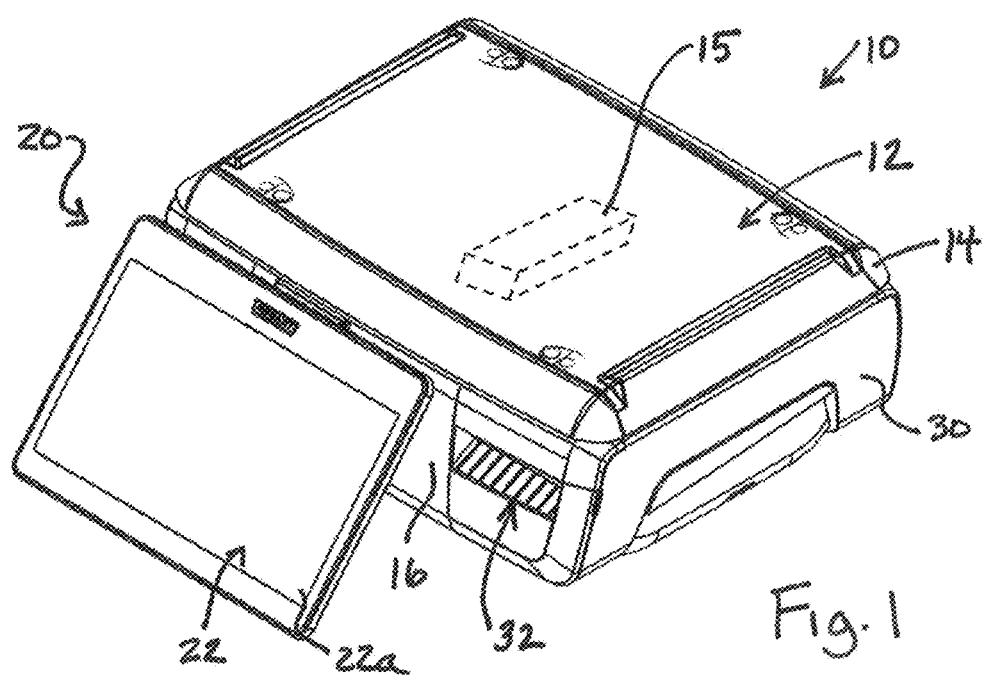
FIGS. 1 and 2 show perspective views of a scale.
Figure 2:
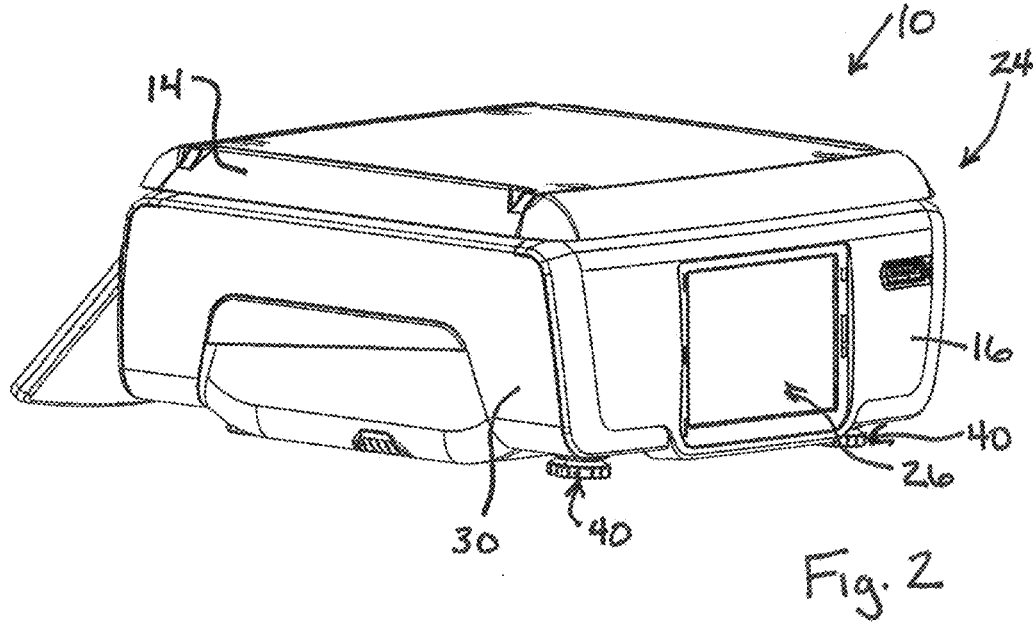
Figures 3, 4:
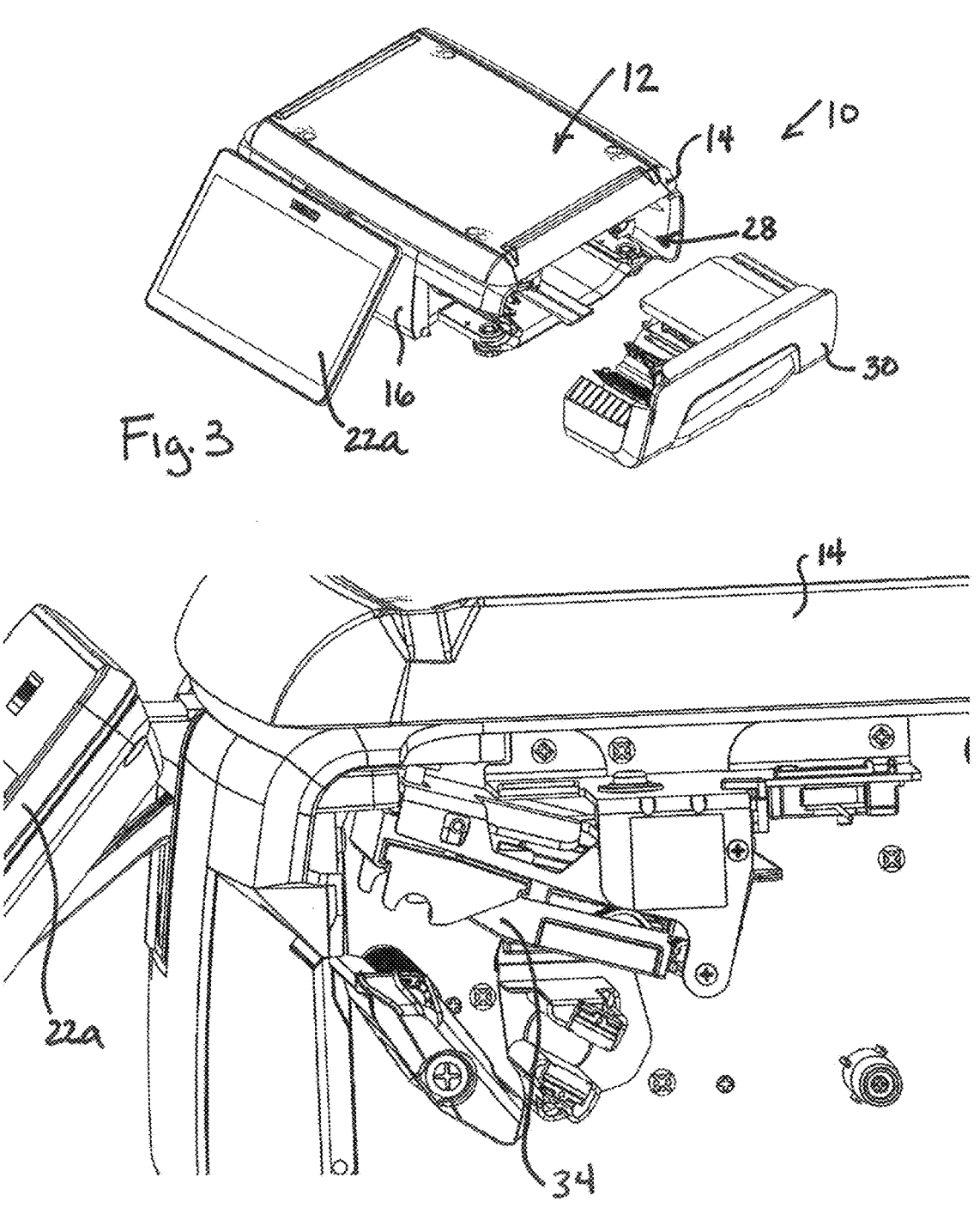
FIG. 3 shows a perspective view with label cassette removed.
FIG. 4 shows a partial perspective of a printhead region within the cassette receiving station.

Referring to FIGS. 1-19, an exemplary scale configuration is shown. The scale 10 includes a weighing station 12, which in some embodiments may be formed by a weighing platter 14 that can be removed (e.g., for cleaning) from atop the scale body 16. A platter support bracket (not shown) transfers forces to a mechanism, such as a load cell 15 located internal of the scale body 16, for producing weight indicative signals when items are placed on the weighing station. An operator interface side 20 of the scale includes an operator interface 22 configured to display information associated with scale operations. By way of example, the operator interface 22 may be formed by a touch-screen display 22a. A customer interface side 24 of the scale includes a customer interface 26, which in certain embodiments may be formed by any suitable display screen technology.

Figure 5:
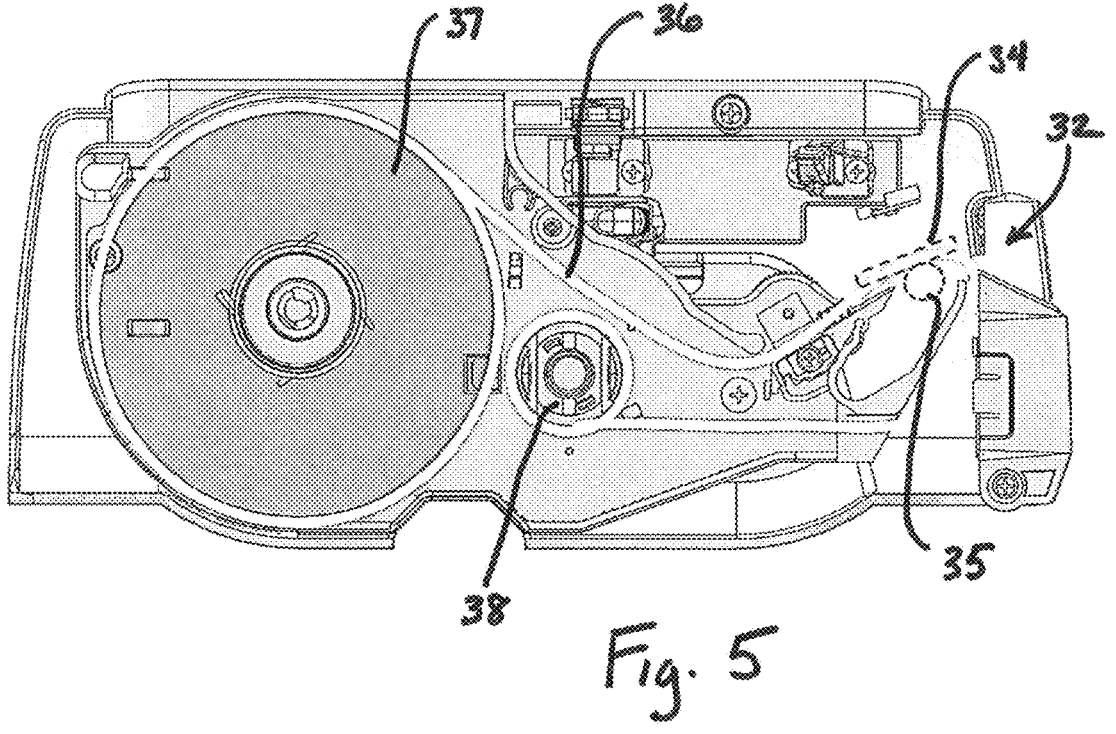
FIG. 5 shows a side elevation cross-section showing a label stock path.
Figures 6, 7:
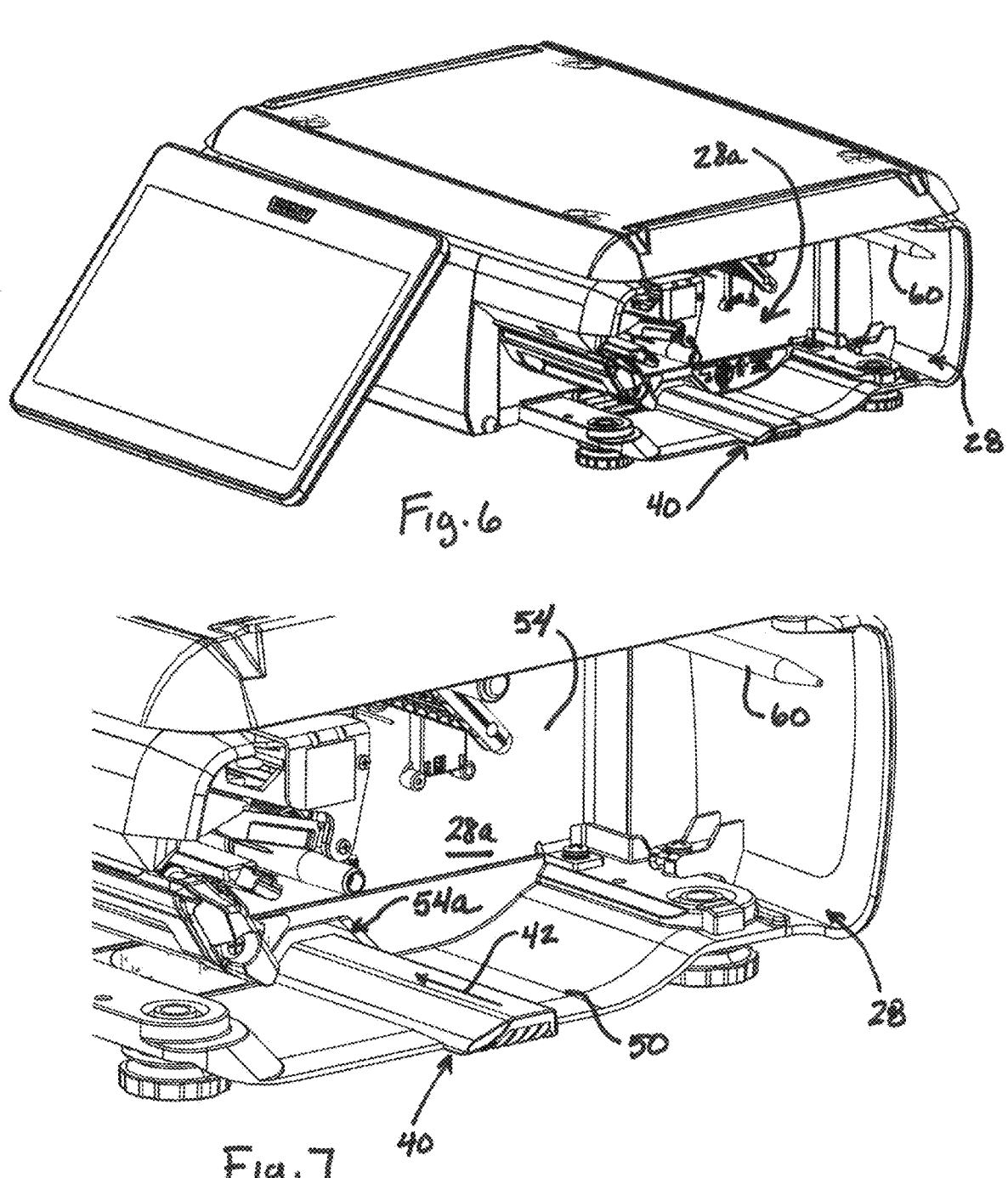
FIGS. 6-9 show perspective views of the cassette station or portions thereof.
Figure 8:
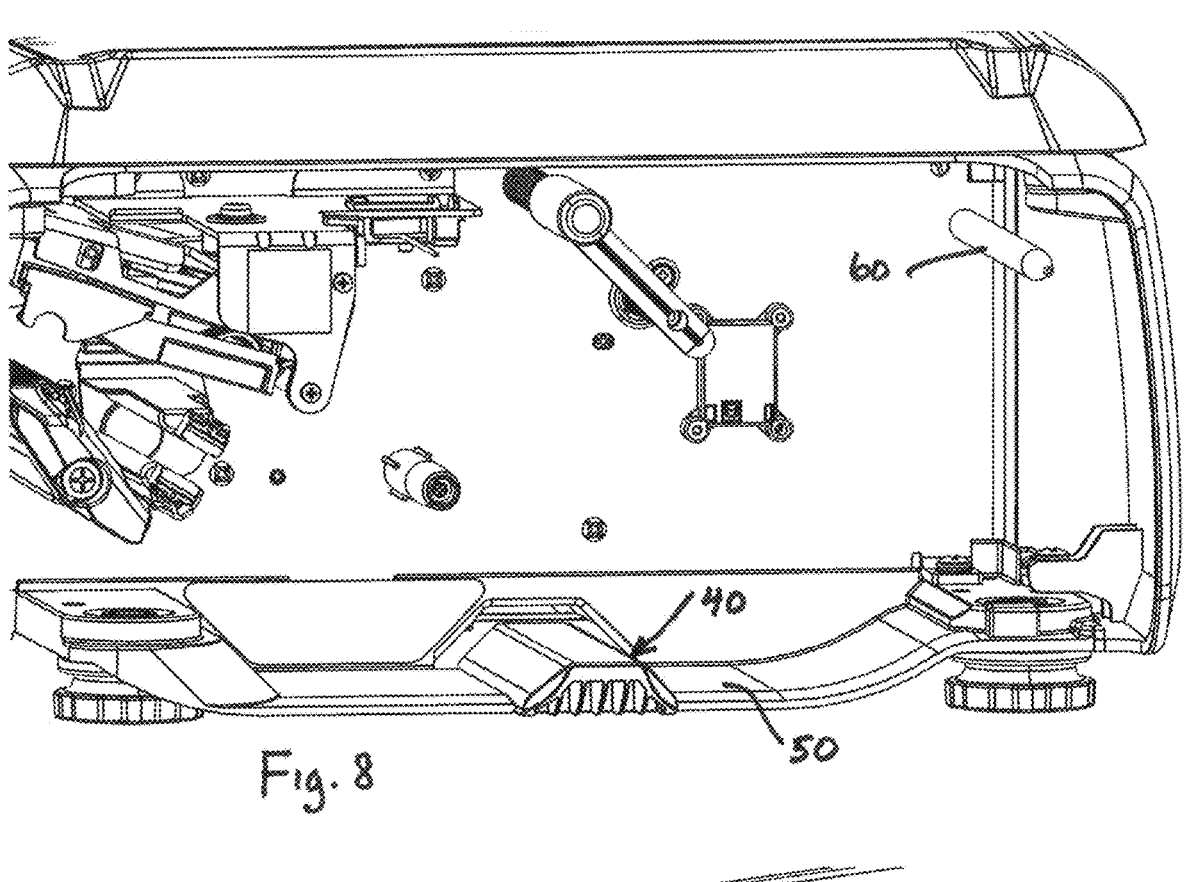
Figure 9:
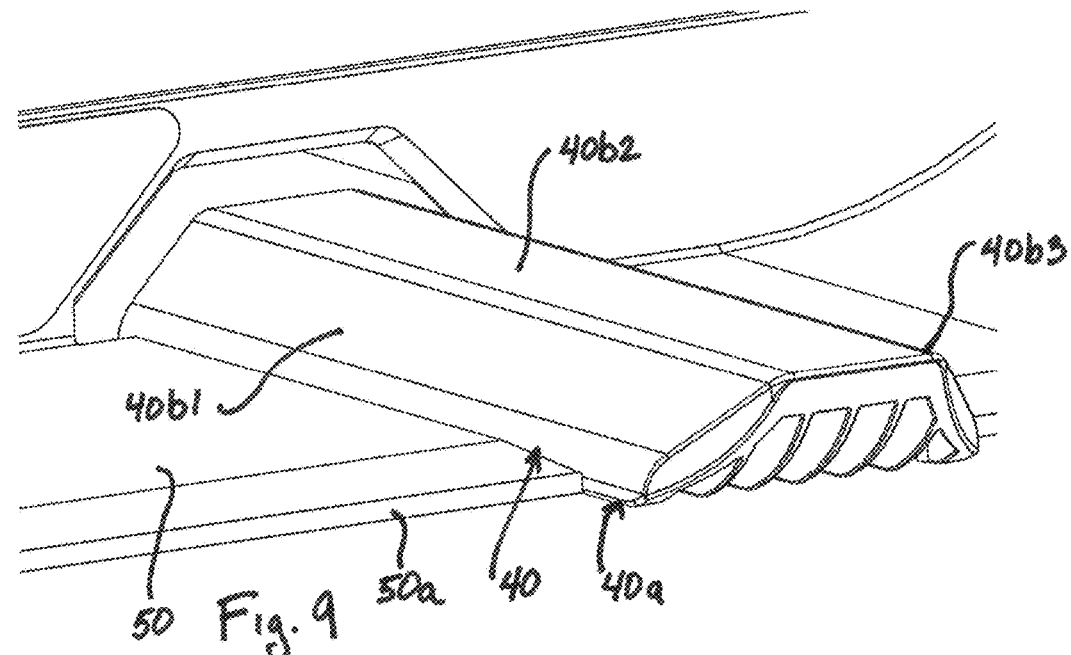
Figure 10:
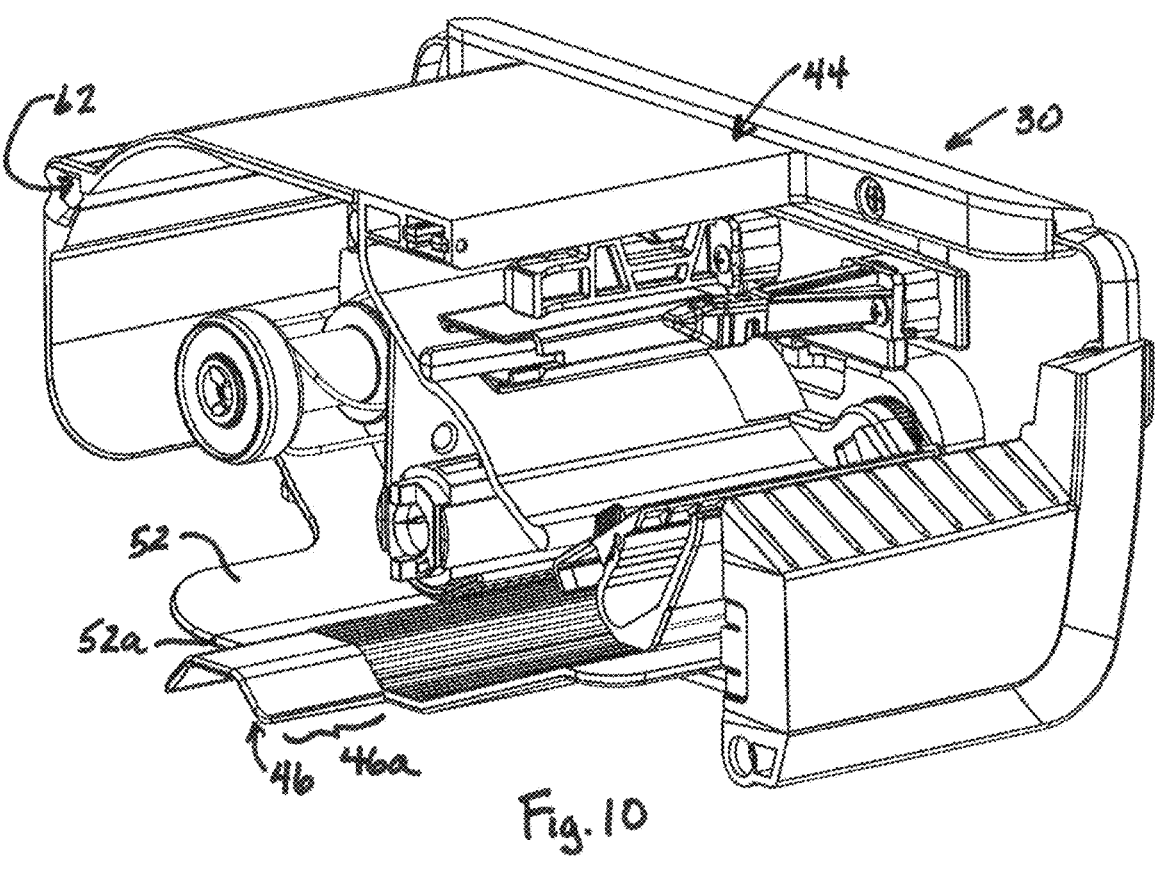
FIGS. 10-11 show perspective views of the cassette.
Figure 11:
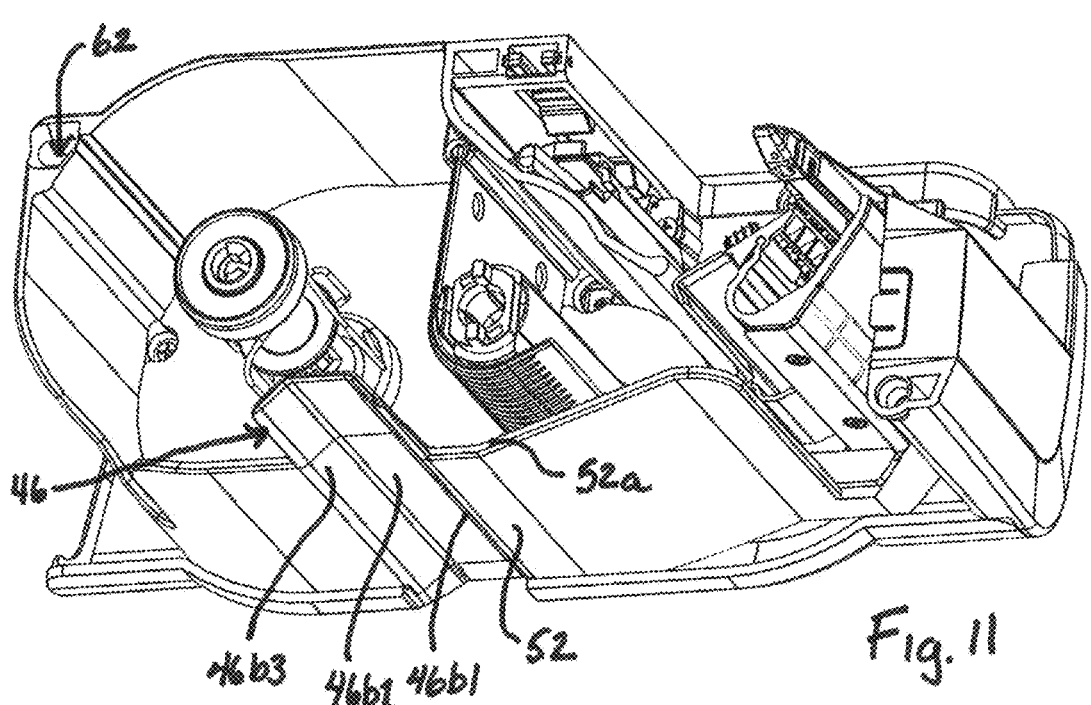

A side portion of the scale body incudes a cassette station 28 that receives a removable label stock cassette 30 that defines a label exit slot 32. A label printer (e.g., a printhead 34 and associated print roller 35) is located within the scale body and may use any suitable printing technology for printing on labels of a label supply roll 37 loaded in the cassette 30, which printed labels then exit the label exit slot 32 to be applied to products. FIG. 5 shows, along a view looking inward into the cassette station, a label stock path 36 for label stock that includes a liner that is taken up on a take-up reel 38, but linerless label stock could also be used. By way of example, the printhead 34 may be a thermal printhead for printing on thermal label stock.

The scale body includes a load ramp 40 extending outward from the cassette station 28. The load ramp 40 defines a linear load path 42 for the media cassette and includes a contoured surface shape in end view looking axially along the load path 42. Here, the load ramp 40 is elongated and the linear load path 42 extends parallel to an axis of the load ramp. Here, the load ramp 40 is a component that is fastened to a housing portion of the scale body (e.g., by fasteners 41). The media cassette 30 includes a cassette body 44 and a load guide 46 that that extends from the cassette body. Here, the load guide is a feature that molded to be a monolithic part of a housing of the cassette body 44, and the cassette body 44 includes an outwardly facing sidewall region with a central grip section 44a, wherein the load guide 46 is aligned with the grip section 44a. The load guide 46 includes a contoured surface shape looking along an axis of the load guide. The surface shape of the load guide 46 is a lower surface shape and the surface shape of the load ramp 40 is an upper surface shape, and the two surface shapes are configured to mate with each other such that the surface shape of the load guide 46 overlies and seats against the surface shape of the load ramp 40 without fully surrounding the load ramp (i.e., the load guide does not circumscribe the load ramp).

The cassette station 28 is defined in part by a lower wall 50, and a distal end portion 40a of the load ramp 40 extends outward beyond an outward facing edge 50a of the lower wall 50. The cassette body 44 includes a lower wall 52, and a distal end portion 46a of the load guide 46 extends inwardly beyond an inward facing edge 52a of the lower wall 52, where the term inward here refers to a direction relative to the cassette station 28 when the cassette 30 is being loaded into the cassette station. This arrangement of protruding or extending portions of both the load ramp 40 and the load guide 46 enables the distal end 46a of the load guide 46 can engage atop the distal end 40a of the load ramp 40 before the cassette body moves into a cassette receiving space 28a defined by the cassette station 28, per FIGS. 14-15. For this purpose, in embodiments, the distal end 40a of the load ramp 40 extends sufficiently from the cassette station and a distal end 46a of the load guide 46 extends sufficiently from the cassette body such that the distal end 46a of the load guide 46 can engage atop the distal end 40a of the load ramp 40 before the cassette body 44 moves into the cassette receiving space 28a defined by the cassette station 28.

Figure 12:
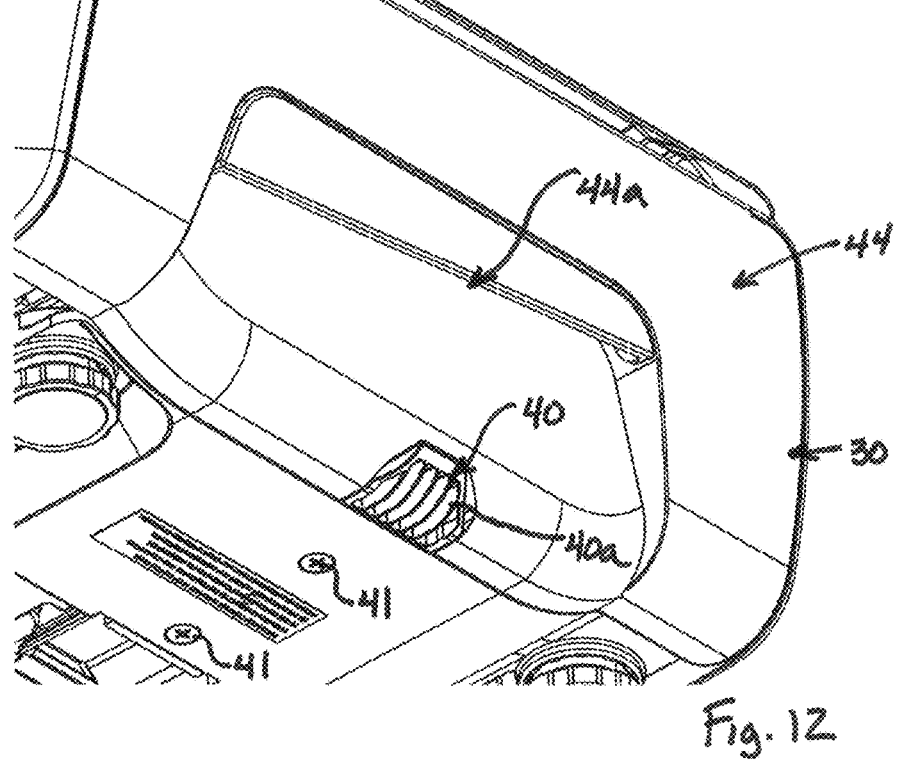
FIG. 12 shows a partial perspective with cassette installed.
Figure 13:
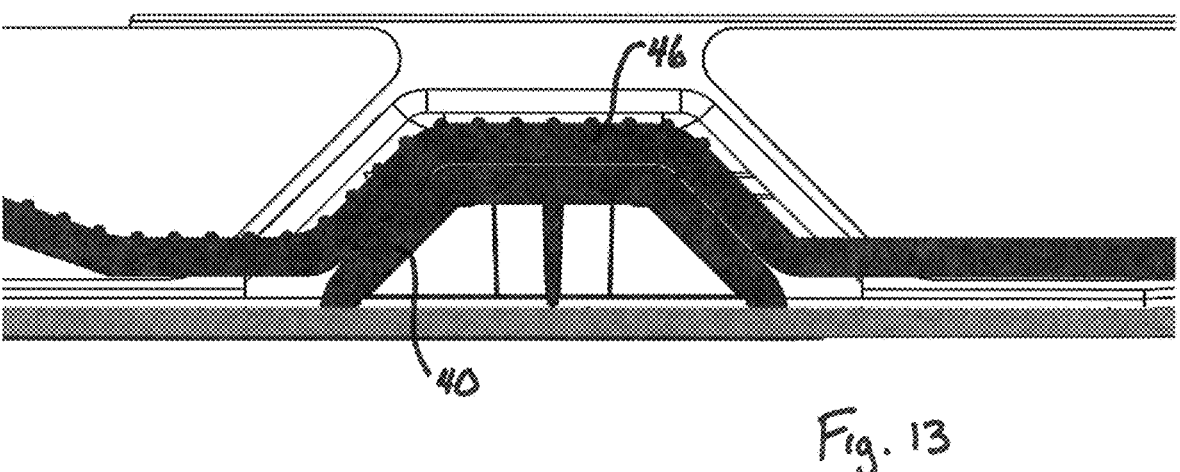
FIG. 13 shows a cross-section with the load guide overlying the load ramp.
Figure 14:
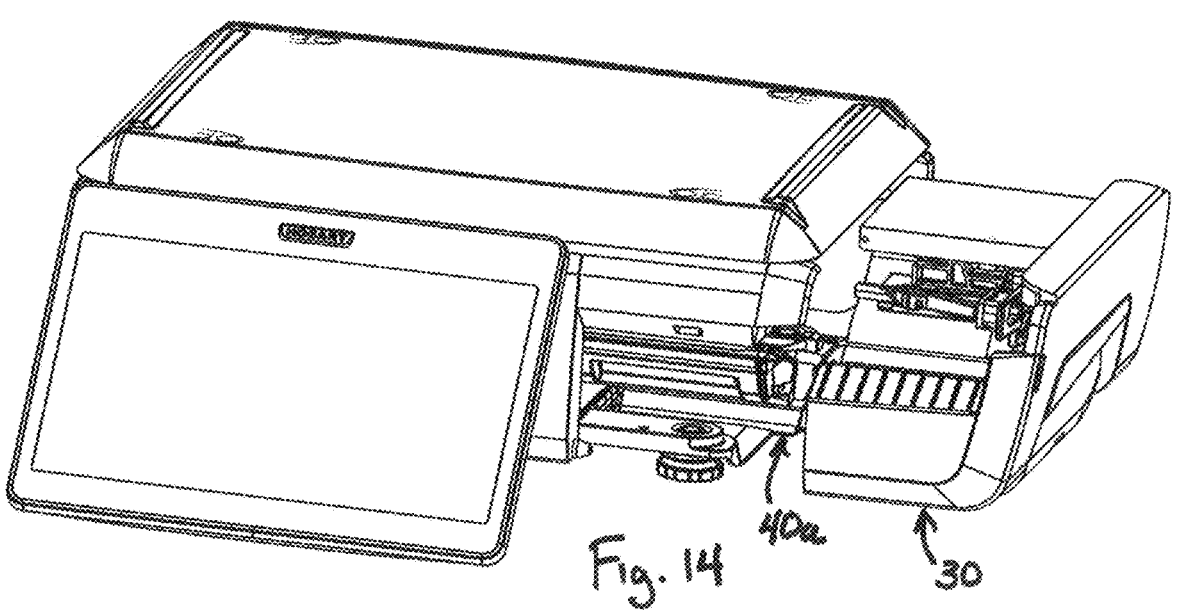
FIGS. 14-15 show perspective views with a cassette in an initial load position before being moved into the cassette station.
Figure 15:
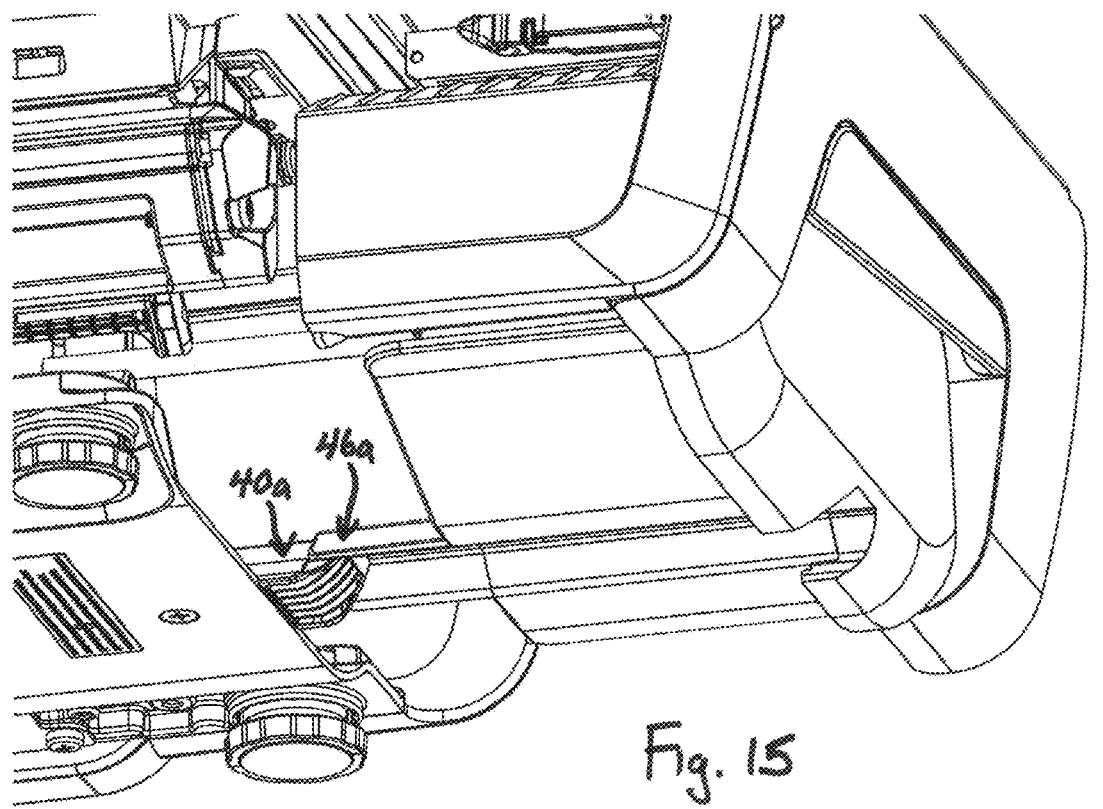
Figures 17, 18:
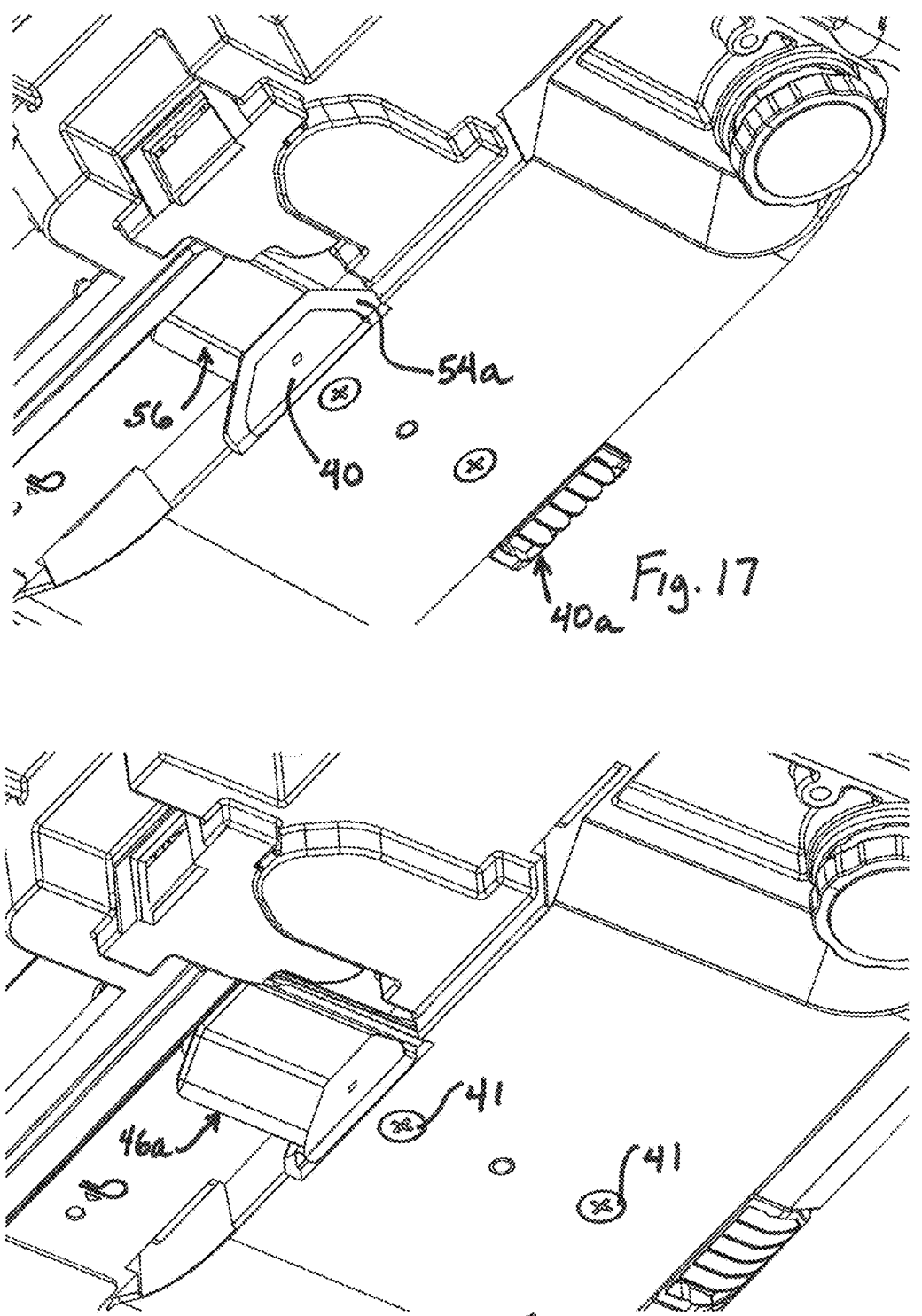
FIGS. 17-18 show partial bottom perspectives from below the cassette station with cassette removed (FIG. 17) and cassette installed (FIG. 19)

Here, per FIG. 12, when the media cassette 30 is in the loaded position, the distal end portion 40a of the load ramp 40 is visible from a location external of the scale body.

In relation to the mating surface shapes, here, the load ramp 40 includes multiple first surface segments 40b1, 40b2 and 40b3 that extend along an axis of the load ramp 40 and that are angulated relative to each other to define the mating surface shape of the load ramp. Similarly, the load guide 46 includes multiple surface segments 46b1, 46b2 and 46b3 that extend along an axis of the load guide 40 and that are angulated relative to each other to define the mating surface shape of the load guide. The mating surface shape of the load ramp is an upwardly and outwardly facing convex shape, and the mating surface shape of the load guide is a downwardly and inwardly facing concave shape, which facilitates the load guide 46 overlying the load ramp 40 to position the cassette 30 in the proper position for loading into the cassette station 28.

Here, an inward side of the cassette station 28 is defined by a wall 54 that includes an opening 54a, and the load ramp 40 extends outwardly away from the wall 54 in a position aligned with the opening 54a. When the media cassette 30 is in the loaded position, the distal end portion 46a of the load guide 46 extends through the opening 54a. An upper surface region 56 within the opening 54a (e.g., on the other side of the wall 54) includes an angulated downward facing surface shape that corresponds to an upwardly angulated surface shape of the distal end 46a of the load guide, for mating between the surface shapes when the cassette is loaded. Here, per FIG. 18, when the media cassette 30 is in the loaded position, the distal end portion 46a of the load guide 46 is visible from a location below and external of the scale body.

The scale body 16 includes an alignment rod 60 extending outwardly from the cassette station 28. The alignment rod 60 is spaced apart from the load ramp 40 and is at a location higher than the load ramp 40. The media cassette 30 includes an elongated hole feature 62 into which the alignment rod 60 extends when the media cassette 30 is in the loaded position. The positioning of the load guide 46 onto the load ramp 40 for the purpose of aligning and loading the cassette 30 assures that the alignment rod 60 will be aligned with the hole feature 62.

Figure 19:
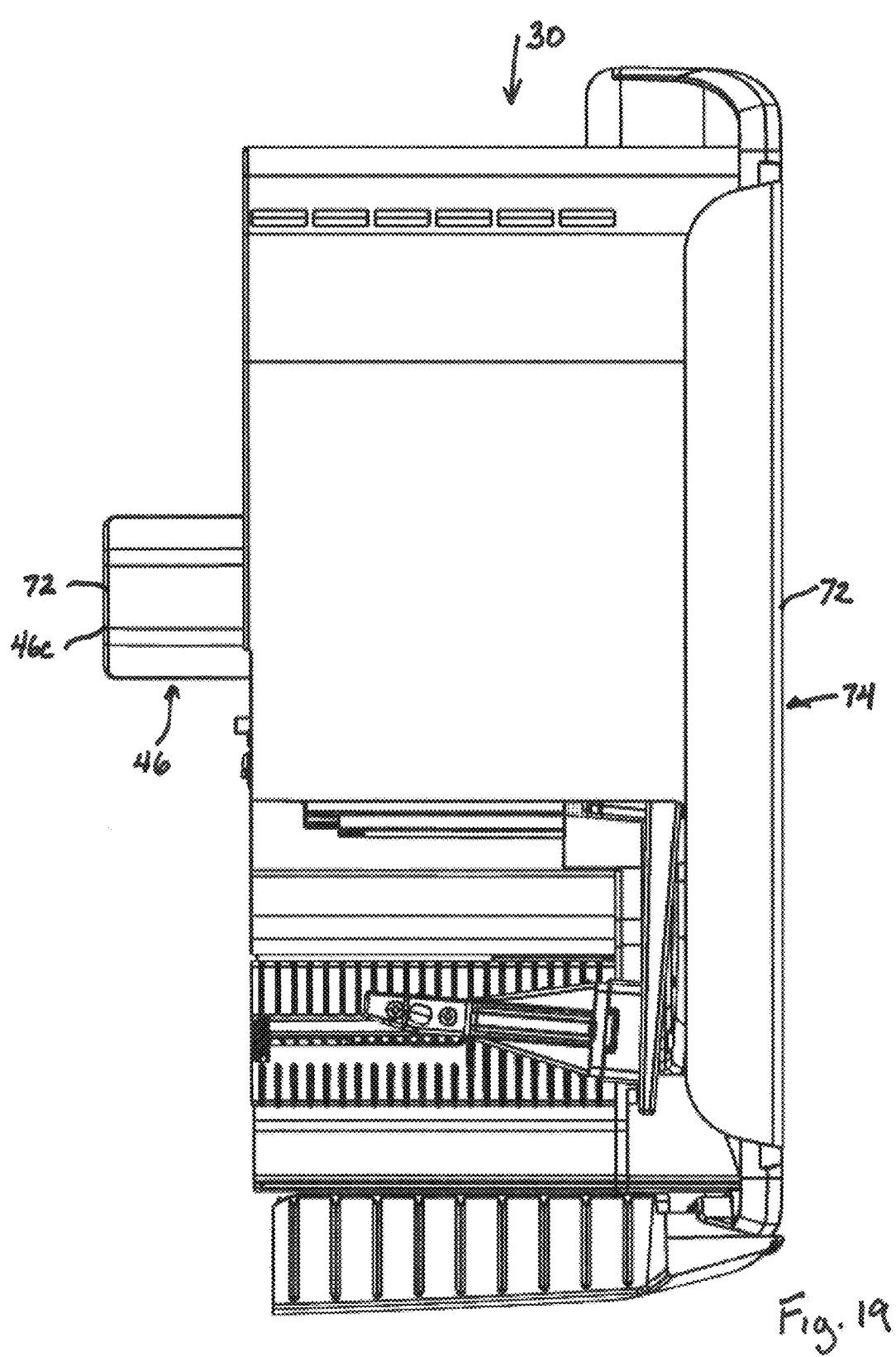
FIG. 19 shows a top plan view depicting the cassette footprint.

In the illustrated embodiment, the media cassette 30 includes a top plan footprint, per FIG. 19, and a maximum dimension of the top plan footprint running in a direction parallel to the load guide axis runs from a first location 70 of the top plan footprint to a second location 72 of the top plan footprint, wherein the first location 70 is defined by a distal end edge 46c of the load guide 46. In the illustrated embodiment, the media cassette includes an outer sidewall 74, the load guide 46 extends inwardly away from the outer side wall along the load guide axis, and the distal end edge 46c of the load guide 46 defines a part of the media cassette that is furthest, in a direction parallel to the load guide axis, from the outer sidewall 74.

The described loading features provide an arrangement whereby the position of the cassette 30 relative to the adjoining scale (or other printer) is initially determined by corresponding extension features centrally located on the lower portions of the cassette and cassette station respectively. These locating features comprise a faceted (or otherwise contoured) load ramp mounted to, and extending from, the base of the cassette station and a faceted load guide feature extending from the base of the cassette. The faceted extension features on the above parts are designed such that the facets on each part easily align and mate up when the cassette 30 is inserted into the cassette station 28. The features are centrally located approximately midway from front to back along a depth of the cassette and cassette station. This initial alignment of the faceted load ramp 40 and load guide 46 establishes the proper "gross alignment" of the cassette 30 relative to the cassette station 28 and allows the remaining locating components (rod 60/hole 62 located at the rear of the cassette station/cassette and print roller support/cassette opening located at the front of the cassette station/cassette) to also align quickly and easily. Because the load ramp and load guide features extend out from the cassette station and cassette respectively, they establish the first points of contact when inserting the cassette into the cassette station and thus facilitate the proper initial orientation of the cassette relative to the cassette station. This new design approach of establishing the correct alignment of the cassette station of the scale (or other printer) and cassette, offers a much improved and more consistent/repeatable method of cassette loading.

When the cassette 30 is positioned near the cassette station, the corresponding faceted features of the load ramp and the load guide offer visual and functional mating/locating surfaces, for quickly and consistently locating the cassette. In embodiments, the cassette 30 is properly located relative to the cassette station by placing the faceted load guide 46 onto the faceted load ramp 40. The mating side facets align the load guide properly onto the load ramp. This establishes the correct alignment of the cassette 30 relative to the cassette station 28, as well as supplying a resting platform for holding the weight of the cassette 30 during loading. Then, as the cassette 30 is moved into the cassette station 28, secondary locating features, the rod 60 and hole 62, located at the rear of the cassette station and cassette, and a print roller support and cassette opening, located at the front of the cassette station and cassette, are aligned. Finally, as the insertion process is completed with the cassette seating and locking into the cassette station, the faceted load guide slides along the faceted load ramp and the two parts remain in contact during operation of the scale/printer.

It is to be clearly understood that the above description is intended by way of illustration and example only, is not intended to be taken by way of limitation, and that other changes and modifications are possible. For example, while the illustrated mating surface shapes of the load ramp and load guide are faceted, curved mating surface shapes are possible. Similarly, while the illustrated mating surface shapes of the load ramp and the load guide are, respectively, an upwardly and outwardly facing convex shape and a downwardly and inwardly facing concave shape, in other embodiments the load ramp could define an upwardly and inwardly facing concave shape and the load guide could define a downwardly and outwardly facing convex shape.

Still other variations are possible.

The invention claimed is:

1. A printer, comprising:
a printer body including a cassette station;
a printhead;
a media cassette for holding a media that moves past the printhead during printing, wherein the media cassette is engageable in a loaded position in the cassette station and is removable from the cassette station for the purpose of media replacement;
wherein the printer body includes a load ramp extending outward from the cassette station, wherein the load ramp defines a linear load path for the media cassette and includes a first surface shape;
wherein the media cassette includes a cassette body and a load guide that extends from the cassette body, wherein the load guide includes a second surface shape;
wherein the second surface shape is configured to mate with the first surface shape by overlying the first surface shape without surrounding the load ramp.

2. The printer of claim 1, wherein the cassette station is defined in part by a first lower wall, wherein a distal end of the load ramp extends outward beyond an outward facing edge of the first lower wall, wherein the cassette body includes a second lower wall, wherein a distal end of the load guide extends inwardly beyond an inward facing edge of the second lower wall, such that the distal end of the load guide can engage atop the distal end of the load ramp before the cassette body moves into a cassette receiving space defined by the cassette station.

3. The printer of claim 1, wherein a distal end of the load ramp extends sufficiently from the cassette station and a distal end of the load guide extends sufficiently from the cassette body such that the distal end of the load guide can engage atop the distal end of the load ramp before the cassette body moves into a cassette receiving space defined by the cassette station.

4. The printer of claim 1, wherein, when the media cassette is in the loaded position, a distal end portion of the load ramp is visible from a location external of the printer body.

5. The printer of claim 1, wherein the load ramp includes multiple first surface segments that extend along an axis of the load ramp and that are angulated relative to each other and that together define the first surface shape, wherein the load guide includes multiple second surface segments extending along an axis of the load guide and that are angulated relative to each other and that together define the second surface shape.

6. The printer of claim 5, wherein the first surface shape is an upwardly and outwardly facing convex shape, wherein the second surface shape is a downwardly and inwardly facing concave shape.

7. The printer of claim 1, wherein the load ramp is elongated and the linear load path extends parallel to an axis of the load ramp.

8. The printer of claim 1, wherein an inward side of the cassette station is defined by a wall, wherein the wall includes an opening, wherein the load ramp extends outwardly away from the wall in a position aligned with the opening, wherein, when the media cassette is in the loaded position, a distal end portion of the load guide extends through the opening.

9. The printer of claim 8, wherein an upper surface region within the opening includes a downwardly facing surface shape that corresponds to an upwardly facing surface shape of the distal end portion of the load guide for mating therewith.

10. The printer of claim 8, when the media cassette is in the loaded position, a distal end portion of the load guide is visible from a location external of the printer body.

11. The printer of claim 1, wherein the first surface shape is an upwardly and outwardly facing convex shape, wherein the second surface shape is a downwardly and inwardly facing concave shape.

12. The printer of claim 1, wherein the printer body includes an alignment rod extending outwardly from the cassette station and spaced apart from the load ramp at a location higher than the load ramp, wherein the media cassette includes an elongated hole feature into which the alignment rod extends when the media cassette is in the loaded position.

13. The printer of claim 1, wherein the load ramp is a component that is fastened to a housing of the printer body, wherein the load guide is a feature that molded to be a monolithic part of a housing of the cassette body.

14. The printer of claim 1, wherein the cassette body includes an outwardly facing sidewall region with a central grip section, wherein the load guide is aligned with the grip section.

15. The printer of claim 1, wherein the printer takes the form of a scale that also includes a weigh station for receiving items to be weighed and a load cell for outputting a weight indicative signal, wherein the printer body is a scale body.

16. A printer, comprising:
a printer body including a cassette station;

a printhead;

a media cassette for holding a media that moves past the printhead during printing, wherein the media cassette is engageable in a loaded position in the cassette station and is removable from the cassette station for the purpose of media replacement;

wherein the printer body includes a load ramp extending outward beyond the cassette station, wherein the load ramp defines a first surface shape;

wherein the media cassette includes a cassette body and a load guide that extends beyond the cassette body, wherein the load guide includes a second surface shape;

wherein the second surface shape is configured to mate with the first surface shape by engaging atop the first surface shape without surrounding the load ramp.

17. The printer of claim 16, wherein the load ramp is located at a bottom of the cassette station and the load guide is located at a bottom of the cassette.

18. The printer of claim 16, wherein the load ramp is located along a middle portion of a depth of the cassette station, and the load guide is located along a middle portion of a depth of the cassette.

19. The printer of claim 18, wherein one of the first surface shape and the second surface shape is convex, and the other of the first surface shape and the second surface shape is concave.

\* \* \* \* \*